(12) United States Patent
O'Dell

(10) Patent No.: US 9,471,989 B2
(45) Date of Patent: Oct. 18, 2016

(54) VASCULAR ANATOMY MODELING DERIVED FROM 3-DIMENSIONAL MEDICAL IMAGE PROCESSING

(71) Applicant: University of Florida Research Foundation, Inc., Gainesville, FL (US)

(72) Inventor: Walter Gene O'Dell, Hawthorne, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 212 days.

(21) Appl. No.: 14/294,768

(22) Filed: Jun. 3, 2014

(65) Prior Publication Data
US 2014/0355858 A1  Dec. 4, 2014

Related U.S. Application Data

(60) Provisional application No. 61/830,338, filed on Jun. 3, 2013.

(51) Int. Cl.
*G06T 7/00* (2006.01)
*G06T 17/00* (2006.01)

(52) U.S. Cl.
CPC ............ *G06T 7/0081* (2013.01); *G06T 17/005* (2013.01); *G06T 2207/10016* (2013.01); *G06T 2207/10072* (2013.01); *G06T 2207/20044* (2013.01); *G06T 2207/20141* (2013.01); *G06T 2207/20148* (2013.01); *G06T 2207/30101* (2013.01); *G06T 2207/30172* (2013.01)

(58) Field of Classification Search
None
See application file for complete search history.

(56) References Cited

U.S. PATENT DOCUMENTS

| 6,842,638 | B1* | 1/2005 | Suri | A61B 6/481 |
| | | | | 382/128 |
| 8,315,963 | B2* | 11/2012 | Wiemker | G06T 7/0012 |
| | | | | 706/45 |
| 2004/0066958 | A1* | 4/2004 | Chen | A61B 6/466 |
| | | | | 382/128 |
| 2006/0159322 | A1* | 7/2006 | Rinck | A61B 6/504 |
| | | | | 382/128 |
| 2007/0165921 | A1* | 7/2007 | Agam | G06T 7/0012 |
| | | | | 382/128 |
| 2009/0060298 | A1* | 3/2009 | Weijers | G06T 7/0012 |
| | | | | 382/128 |

(Continued)

OTHER PUBLICATIONS

Shikata et al. "Segmentation of Pulmonary Vascular Trees from Thoracic 3D CT Images," International Journal of Biomedical Engineering, vol. 2009 (2009), Article ID 636240, pp. 1-11.*

(Continued)

*Primary Examiner* — Matthew Bella
*Assistant Examiner* — Soo Shin
(74) *Attorney, Agent, or Firm* — Jon A. Gibbons; Fleit Gibbons Gutman Bongini & Bianco, P.L.

(57) ABSTRACT

Systems and methods to develop a vascular model of vascular trees that are captured with 3-Dimensional medical imaging data of a subject. Image processing iteratively traverses vessel image segments within the imaging data and creates a vessel model defined within a data structure that defines branch segments and bifurcation points where those branch segments split. The model generation algorithms incorporate strategies and parameters to identify and repair falsely identified bifurcations that reflect false inter-tree and intra-tree connections that can appear when processing images with complicated vessel trees. Accurate traversal of the vessel tree as portrayed in 3-Dimensional medical images is emphasized to correctly label branch generations and identify and repair erroneous interconnections between adjacent trees.

19 Claims, 7 Drawing Sheets

(56) References Cited

U.S. PATENT DOCUMENTS

| | | | |
|---|---|---|---|
| 2009/0148024 A1* | 6/2009 | Park | G06T 7/0081 382/134 |
| 2009/0177444 A1* | 7/2009 | Wiemker | G06T 7/0081 703/1 |
| 2010/0310146 A1* | 12/2010 | Higgins | G06T 7/0083 382/131 |
| 2011/0026793 A1* | 2/2011 | Goel | G06T 7/0085 382/131 |
| 2011/0255761 A1 | 10/2011 | O'Dell et al. | |
| 2011/0293150 A1* | 12/2011 | Capolunghi | G06K 9/00 382/128 |
| 2012/0041318 A1* | 2/2012 | Taylor | A61B 5/02007 600/504 |
| 2013/0158970 A1* | 6/2013 | Hof | G06T 7/0083 703/11 |
| 2015/0010225 A1* | 1/2015 | Popovic | A61B 1/00009 382/131 |

OTHER PUBLICATIONS

Sato, Y., et al., "Three-dimensional multi-scale line filter for segmentation and visualization of curvilinear structures in medical images," Medical Image Analysis, Feb. 1998, pp. 143-168, vol. 2. Oxford University Press.

Wang, P., et al., "Lung metastases detection in CT images using 3D template matching," American Association of Physicists in Medicine, Mar. 2007, pp. 915-922.

Ambrosini, R., et al., "Volume change determination of metastatic lung tumors in CT images using 3-D template matching," Proceedings of SPIE Medical Imaging, Feb. 2009, pp. 1-8.

Kawut, S., et al., "New Predictors of Outcome in Idiopathic Pulmonary Arterial Hypertension," The American Journal of Cardiology, Jan. 15, 2005, pp. 199-203, vol. 95. DOI:10.1016/j.amjcard.2004.09.006.

Newman, J., et al., "Pulmonary Arterial Hypertension: Future Directions: Report of a National Heart, Lung and Blood Institute/Office of Rare Diseases Workshop", Jun. 22, 2004, pp. 2947-2952. DOI: 10.1161/01.CIR.0000132476.87231.6F.

Farber, H., et al., "Pulmonary Arterial Hypertension," The New England Journal of Medicine, Oct. 14, 2004, pp. 1655-1665.

Hawkins A., et al., "Treatment of pediatric pulmonary hypertension," Vascular Health and Risk Management, Jun. 3, 2009, pp. 509-524.

De Leval, M., et al., "Use of computational fluid dynamics in the design of surgical procedures: application to the study of competitive flows in cavopulmonary connections," The Journal of Thoracic and Cardiovascular Surgery pp. 502-513, Mar. 1996, vol. 111, No. 3.

Voelkel, N., et al., "Cellular and molecular mechanisms in the pathogenesis of severe pulmonary hypertension," European Respiratory Journal, Mar. 1995, pp. 2129-2138. DOI: 10.1183/09031936.95.08122129.

Gan, C., et al., "Noninvasively assessed pulmonary artery stiffness predicts mortality in pulmonary arterial hypertension," Chest: Official Publication of the American College of Chest Physicians, Nov. 7, 2007, pp. 1906-1912, DOI 10.1378/chest.07-1246.

Kheyfets, V., et al., "Considerations for Numerical Modeling of the Pulmonary Circulation—A Review With a Focus on Pulmonary Hypertension," Journal of Biomechanical Engineering, Jun. 2013, pp. 1-15, vol. 135. DOI: 10.1115/1.4024141.

Sanz, J., et al., "Evaluation of Pulmonary Artery Stiffness in Pulmonary Hypertension With Cardiac Magnetic Resonance," Jacc: Cardiovascular Imaging, Aug. 2008, pp. 286-295, vol. 2, No. 3. DOI:10.1016/ j.jcmg.2008.08.007.

Su, Z., et al., "Impact of pulmonary vascular stiffness and vasodilator treatment in pediatric pulmonary hypertension: 21 patient-specific fluid—structure interaction studies,". Computer Methods and Programs Biomedicine, Sep. 9, 2011, pp. 617-628, DOI:10.1016/j.cmpb.2011.09.002.

Van Wolferen, S., et al., "Prognostic value of right ventricular mass, volume, and function in idiopathic pulmonary arterial hypertension," European Heart Journal, Jan. 22, 2007, pp. 1250-1257, DOI:10.1093/eurheartj/ehl477.

Van Wolferen, S., et al., "Clinically significant change in stroke volume in pulmonary hypertension," Chest: Official Publication of the American College of Chest Physicians, May 2011, pp. 1003-1009, DOI 10.1378/chest.10-1066.

Boerrigter, B., et al., "Progressive dilatation of the main pulmonary artery is a characteristic of pulmonary arterial hypertension and is not related to changes in pressure," Chest: Official Publication of the American College of Chest Physicians, Dec. 2010, pp. 1395-1401, DOI 10.1378/chest.10-0363.

O'Dell, W., "Automatic segmentation of tumor-laden lung volumes from the LIDC database," Proceedings of SPIE Medical Imaging 2012: Computer-Aided Diagnosis, Feb. 2012, pp. 1-7, vol. 8315, DOI: 10.1117/12.911379.

Adams, R., et al., "Seeded Region Growing," IEEE Transactions on Pattern Analysis and Machine Intelligence, Jun. 1994, pp. 641-647, vol. 16, No. 06.

Sethian, J., "A fast marching level set method for monotonically advancing fronts," Proceedings of National Academy of Sciences, Feb. 1996, pp. 1591-1595, vol. 93.

Zhou, C., et al., "Automatic multiscale enhancement and segmentation of pulmonary vessels in CT pulmonary angiography images for CAD applications," NIH Public Access, Dec. 2007, pp. 4567-4577.

Van Dongen, E., et al., Automatic segmentation of pulmonary vasculature in thoracic CT scans with local thresholding and airway wall removal. IEEE International Symposium on Biomedical Imaging: From Nano to Macro, Apr. 2010, pp. 668-671, DOI:10.1109/ISBI.2010.5490088.

Buelow, T, et al., "Automatic extraction of the pulmonary artery tree from multi-slice CT data," Medical Imaging Physiology, Function, and Structure from Medical Images, Apr. 2005, pp. 730-740, vol. 5746. DOI: 10.1117/12.595286.

Gavrielides, M., et al., A resource for the assessment of lung nodule size estimation methods: database of thoracic CT scans of an anthropomorphic phantom. Optics Express, Jul. 5, 2010, pp. 1-12, vol. 18, No. 14.

Razavi, H. et al. "A method for quantitative characterization of growth in the 3-D structure of rat pulmonary arteries," Microvascular Research, Jan. 2012, pp. 146-153, vol. 83. DOI:10.1016/j.mvr.2011.12.003.

Ebrahimdoost, Y., et al., "Automatic segmentation of Pulmonary Artery (PA) in 3D pulmonary CTA images," 17th International Conference on Digital Signal Processing (DSP), Jul. 2011, pp. 1-5.

Abramoff, M., et al.,"Image Processing with ImageJ," Biophotonics International, Jul. 2004, pp. 1-7, vol. 11 Issue 7.

Lee, T., et al., "Building skeleton models via 3-D medial surface/axis thinning algorithms," Cvgip: Graphical Models and Image Processing, Nov. 1994, pp. 462-478, vol. 56, No. 6.

Frangi, A., et al., "Multiscale vessel enhancement filtering," In Medical Image Computing and Computer-Assisted Intervention, Oct. 1998, pp. 130-137, vol. 1496.

Shang, Y., et al., "Vascular Active Contour for Vessel Tree Segmentation," IEEE Transactions on Biomedical Engineering, Apr. 2011, pp. 1023-1032, vol. 58, No. 4.

Shikata, H., et al., "Segmentation of Pulmonary Vascular Trees from Thoracic 3D CT Images," International Journal of Biomedical Imaging, Sep. 23, 2009, pp. 1-11, vol. 2009. DOI:10.1155/2009/636240.

Shingrani, R., et al., "Automation process for morphometric analysis of volumetric CT data from pulmonary vasculature in rats," Comput Methods Programs Biomed, Jan. 2010, pp. 1-36, vol. 97. DOI:10.1016/j.cmpb.2009.07.009.

Hansell, D., "Small-Vessel Diseases of the Lung: CT-Pathologic Correlates," Radiology, Jan. 2002, pp. 639-653, vol. 225, No. 3.

Huang, W., et al., "Morphometry of the human pulmonary vasculature," Journal of Applied Physiology, Nov. 1996, pp. 2123-2133, vol. 85, Issue 5.

White, R., et al., "Plexiform-like lesions and increased tissue factor expression in a rat model of severe pulmonary arterial hyperten-

(56) References Cited

OTHER PUBLICATIONS sion," American Journal Lung Cellular and Molecular Physiology, Jun. 22, 2007, pp. 583-590. DOI:10.1152/ajplung.00321.2006.

Tuder, R., et al., "Exuberant endothelial cell growth and elements of inflammation are present in plexiform lesions of pulmonary hypertension," American Journal of Pathology, Feb. 1994, pp. 275-285, vol. 144, No. 2.

Pietra, G., et al., "Histopathology of Primary Pulmonary Hypertension: A Qualitative and Quantitative Study of Pulmonary Blood Vessels From 58 Patients in the National Heart, Lung, and Blood Institute, Primary Pulmonary Hypertension Registry," Division of Lung Diseases, Jul. 19, 1989, pp. 1198-1206. vol. 80, Issue 5.

Cool, C., et al., "Pathogenesis and evolution of plexiform lesions in pulmonary hypertension associated with scleroderma and human immunodeficiency virus infection," Aug. 1996, pp. 434-442.

Gavrielides, M., et al., "FDA phantom CT database: a resource for the assessment of lung nodule size estimation methodologies and software development," Proceedings of SPIE 7624, Medical Imaging: Computer-Aided Diagnosis, Mar. 9, 2010. Conference No. 7624.

* cited by examiner even in separated tree structures. For example, a Generally, processing of 3-Dimensional medical imaging

VASCULAR ANATOMY MODELING DERIVED FROM 3-DIMENSIONAL MEDICAL IMAGE PROCESSING

CROSS-REFERENCE TO RELATED APPLICATIONS

This application claims priority from prior provisional application 61/830,338 filed on 3 Jun. 2013. The entire collective teachings thereof being herein incorporated by reference.

FIELD OF THE DISCLOSURE

The present disclosure generally relates to processing medical imaging data, and more particularly to constructing a vascular anatomy model depicted within portions of the medical imaging data.

BACKGROUND

Detailed characterization of pulmonary vascular anatomy in one or more portions, such as in an organ, of a person or other living being has important applications for the diagnosis and management of a variety of diseases, including adult pulmonary arterial hypertension, pulmonary embolus, and neonatal persistent pulmonary hypertension. Proper characterization of the vascular tree structure aids in clinical decision-making, assessment of therapeutic efficacy, and evaluation of novel therapies. Accurate quantification of the vascular tree structure also enhances the ability to understand the biological and biomechanical underpinnings of these diseases and the sequelae of events that lead to disease progression and patient death. By quantifying the morphological features of the vascular tree, including the number of branches, number of branch generations, length and average radius of each branch, bifurcation angles, and vessel tortuosity, one can compute the total vascular volume, histograms of branch radii and lengths, and distribution of blood volume among branch radii and generations. Such data, particularly over a period of time, aids in the assessment of disease progression, treatment efficacy, or both Generally, processing of 3-Dimensional medical imaging data, such as is produced by Computed Tomography, is used to characterize vascular anatomy. Vessel segmentation has been used chiefly to gather information on the number or branches, number of bifurcations, and branch length and volume. The use of large through-plane voxel dimensions (i.e., relatively thick image slices) and patient motion during pulmonary imaging lead to false apparent connections between neighboring but independent vascular trees. Both conditions result in neighboring vessels that blur into the same voxel, thereby making them appear to be contiguous in the image set.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
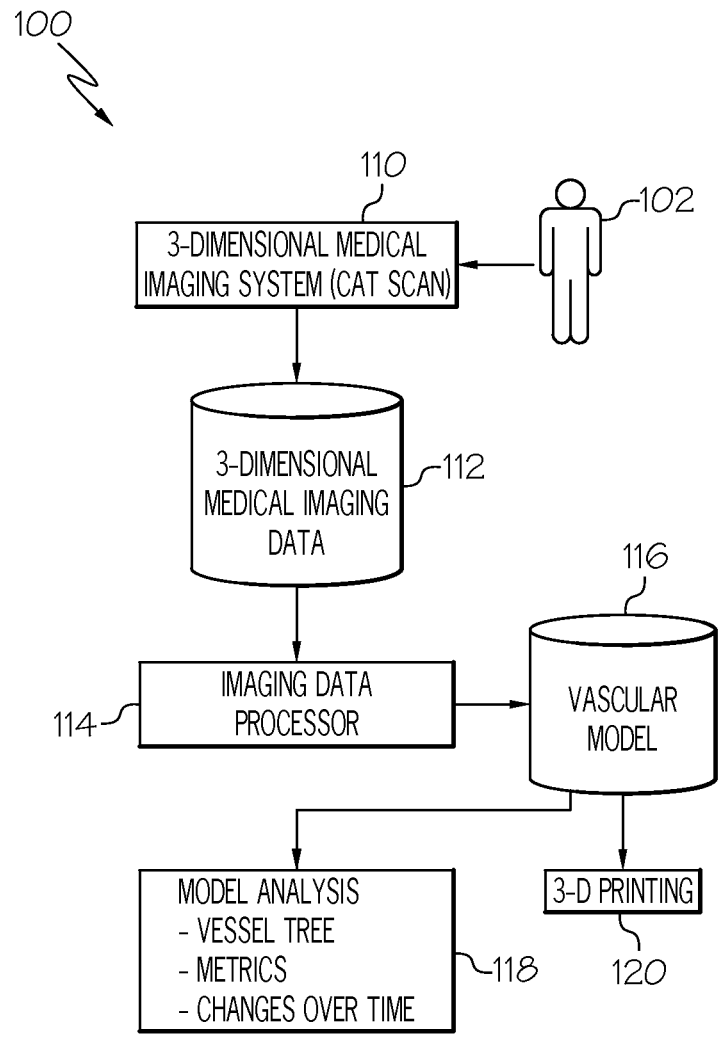
FIG. 1 illustrates a 3-Dimensional medical imaging generation and analysis system in accordance with one example.

Described below are systems and methods that perform automated analyses of medical imaging data, including 2-Dimensional and 3-Dimensional medical imaging data such as is obtained through Computed Tomography (CT) imaging techniques, similar techniques, or as is obtained through any other suitable current or future technique. The analysis determines vascular anatomy models, referred to herein as vascular models, that correspond to vessels identified in medical imaging data. The determined vascular models are able to be used for a variety of purposes. The below description is based on an example of processing 3-Dimensional medical imaging data of a lung to ultimately support characterizing and determining metrics for blood vessels present in the lung captured within the imaging data.

The below described systems and methods distinguish and characterize individual vascular trees from among a complex intermingling of vascular trees that are captured with 3-Dimensional medical imaging data of certain portions of a subject. The below systems provide improvements in processing to ultimately obtain metrics for the vascular anatomy captured in the 3-Dimensional images and thereby improve the ability to characterize changes over time in the vascular structure in response to diseases and treatments in a clinical setting. These systems and methods utilize algorithms that incorporate strategies and parameters to identify and repair falsely identified bifurcations that reflect false inter-tree and intra-tree connections within traversed complicated vessel trees that are commonly captured by 3-Dimensional medical imaging.

The system and methods described below emphasize accurate traversal of the vessel tree as portrayed in 3-Dimensional medical images to correctly label branch generations and identify and repair erroneous interconnections between adjacent trees. False apparent connections are able to appear between neighboring but independent vascular trees in pulmonary imaging for many reasons, such as the use of large through-plane voxel dimensions (i.e. relatively thick image slices) and/or patient motion occurring during a scan. Both of these effects result in neighboring vessels that blur into the same voxel, thereby making them appear to be contiguous in the image set. Below are presented systems and method that incorporate strategies and parameters used to traverse complicated vessel trees within 3-Dimensional medical images, by beginning from a seed point located near the root of the vessel tree and proceeding through the entire vessel tree structure. The below systems and methods further operate to identify and repair false-apparent tree connections.

The following description is based upon an example that applies certain methods to determine and characterize the pulmonary vasculature of a person's lungs based upon processing of three-dimensional (3D) X-ray Computed Tomography (CT) images of that person's chest. However, it is clear that the techniques described below are easily able to be applied to accommodate other vascular tree structures and imaging modalities.

FIG. 1 illustrates a 3-dimensional medical imaging generation and analysis system 100 in accordance with one example. The 3-Dimensional medical imaging generation and analysis system 100 includes a 3-Dimensional medical imaging system 110, such as a Computed Tomography (CT) imaging system. In further examples, any type of medical imaging system that is suitable for capturing the vascular data processed by the following described techniques can be used. For example, one or more of various radiographic techniques, Magnetic Resonance Imaging (MRI), ultrasonic, or combinations thereof, are able to be utilized by a 3-Dimensional medical imaging system to capture internal imaging data to be analyzed. The 3-Dimensional medical imaging system 110 captures 3-dimensional medical images of structures that are internal to a subject 102. In various examples, the subject 102 is able to be a human, an animal, an animate subject or inanimate object, or any type of object for which 3-Dimensional internal imaging data is able to be obtained by the 3-dimensional medical imaging system The 3-dimensional medical imaging system 110 produces sets of data that define the captured 3-dimensional medical image of the subject 102. In the illustrated example, 3-Dimensional imaging data is stored in a 3-Dimensional medical imagining data storage 112. The 3-Dimensional medical imagining data storage 112 of one example is a conventional database used to store the multiple components of a 3-Dimensional image, such as the multiple "slices" of 2-Dimensional imaging data captured by a CT imaging process to create a single 3-Dimensional medical imaging data set.

The 3-Dimensional medical imaging generation and analysis system 100 includes an image data processor 114 adapted to receive and process 3-Dimensional medical image data as is described in further detail below. The image data processor 114 in one example produces a 3-Dimensional vascular model reflecting the physical structure, including their location and sizes, of vessels that are captured and detected within 3-dimensional medical image data for a portion of the subject 102. The image data processor 114 receives image data from the 3-Dimensional medical imaging data storage 112 and outputs data defining the 3-Dimensional vascular model into a vascular model storage 116. In various examples, the 3-Dimensional vascular model stored into the vascular model storage 116 is able to be in any suitable form, such as a listing of 3-Dimensional locations for points along the center line of each vessel, where each point location further has a stored value of vessel radius at that center line point.

The 3-Dimensional vascular model in one example is able to further support analysis of the vessel structure of a volume within the subject 102. Such analysis is able to, for example, quantify metrics associated with the vessel tree of an organ such as a lung. Metrics such as total volume, histograms of the number of vessels having a radius falling within certain ranges, and the like, are able to be calculated based upon the 3-Dimensional vascular model. Further, changes to the vascular structure of the portion of the subject 102 are able to be observed and characterized by processing 3-Dimensional imaging data for the subject 102 that are captured at different times to determine a corresponding time sequence of vascular models for the subject 102. This time sequence of vascular models is therefore able to be analyzed to determine changes in the vascular structure of the subject 102. Such changes are useful in determining, for example, the effectiveness of treatments directed to improving the vascular condition of the subject 102, the progress of diseases related to vascular deterioration in the subject 102, and many other useful purposes.

Additionally, a physical 3-Dimensional model of the vascular structure of at least a portion of the subject 102 is able to be created through 3-D printing 120. 3-D printing is a known technique of creating a physical 3-D model of a structure defined by a number of points at physical locations, such as is created or the vascular model by the techniques described below.

Figure 2:
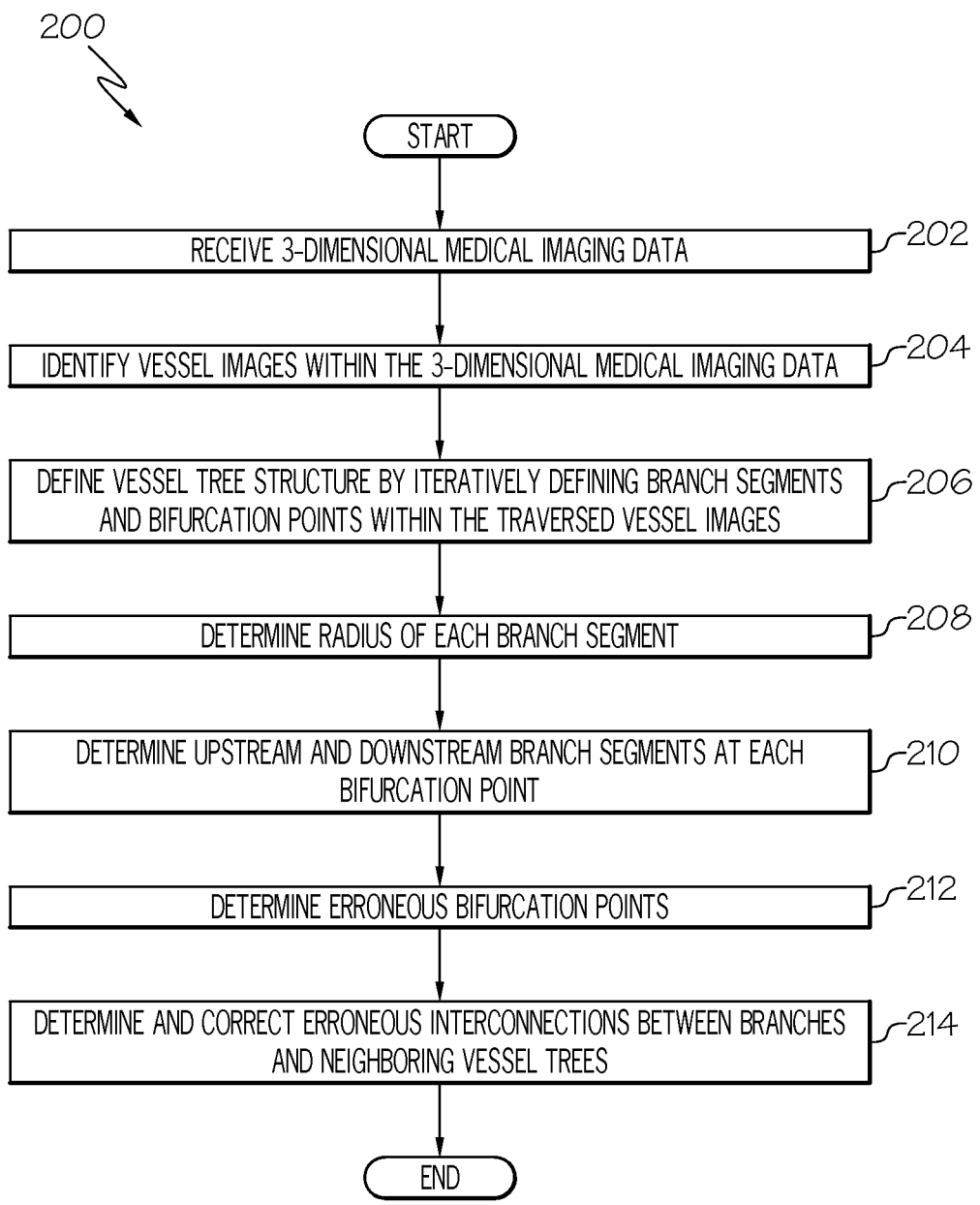
FIG. 2 illustrates a vascular model definition process, according to an example.

FIG. 2 illustrates a vascular model definition process 200, according to an example. The vascular model definition process 200 is an example of a process that receives 3-Dimensional medical imaging data for at least a portion of a subject and creates a vascular model of vessels depicted within the 3-dimensional medical imaging data. With reference to the 3-Dimensional medical imaging generation and analysis system 100 described above, the vascular model definition process 200 is performed by the imaging data processor 114 based upon imaging data received from the 3-Dimensional medical imaging data storage 112 to produce a vascular model that is stored in the vascular model storage 116. The following description describes an example process used to produce a 3-Dimensional model of the blood vessels in a person's lungs by processing 3-Dimensional medical images captured in a CT imaging process that include 3-Dimensional medical imagine of a person's chest cavity, including the lungs.

The vascular model definition process 200 begins by receiving, at 202, 3-Dimensional medical imaging data. In one example, the 3-Dimensional medical imaging data consists of CT imaging data captured by using 120 kVp X-rays, with an X-ray tube current of 160; exposure of 100; a 512×512 reconstructed in-plane imaging matrix (corresponding to an in-plane pixel dimension of 0.7815×0.78125 mm); slice thickness of 5 mm and slice separation of 2.5 mm (overlapping slices) for a total of 119 reconstructed axial slices with 2.5-mm slice center-to-center separation covering the chest.

The vascular model definition process 200 continues by identifying, at 204, vessel images within the 3-Dimensional medical imaging data. Vessel identification in one example includes a sequence of image preprocessing followed by vessel image extraction. In one example, the received images are prepared by preprocessing to isolate and extract the volume of interest, which is the lung volume of the subject in this example, from the received 3-Dimensional image data. In one example, preprocessing to extract the lung volume from other structures in the received images includes applying intensity thresholds and morphological steps to the received image data in order to isolate the lung volume from the body and the intestines of the subject, separate the left and right hemi-lungs, and remove image components of vessels and other objects that are within the lung volume.

Vessel identification proceeds in one example by a process referred to as skeletonization. Skeletonization refers to processing the received image data to extract vessel images and identify a skeleton of the vascular structure captured in the received image data. A process of vessel segmentation that includes extraction and identification of the vessel components from the image is used in one example. Extraction refers in this context to processing image data to separate vessel voxels from the voxels corresponding to background lung parenchyma. In one example, such separation is accomplished by applying an intensity threshold. In one example, an initial intensity threshold is applied to each image set to extract the chest wall from the lung parenchyma. A threshold of −370 Hounsfield Units (Hu) is used based on experimental data. Image preprocessing in one example further includes a closing operation using a 7 or 8 mm in diameter disk element to clip vessels of 14 or 16 mm in diameter and smaller from the hilar region to be included within the lung volume of interest. A final erosion operation using a 2-pixel disk element is applied to each slice to remove spurious bright pixels at the chest wall-lung interface. The binary stack of images is then applied as a mask to the original CT data in order to limit the subsequent analyses to the lung volume.

Identification of vessel images within the received image data includes distinguishing vessel components in the images from other bright objects in the image of the lung, such as tumors, fibrotic regions, edema, or combinations of these. The extraction and identification steps are able to be combined in one example when an initial seed point is placed inside a vessel of interest, usually near the vessel tree root, and a seeded region-growing approach is used to identify all vessel voxels that have intensities above a predefined threshold and that are connected to the seed voxel. The extraction and identification in one example includes iteratively identifying, based on traversing identified image elements within 3-Dimensional medical image data, respective identified branch segments within a plurality of identified branch segments of at least one vessel tree. The identified elements include those image components that are able to be discerned from the 3-Dimensional medical imaging data.

Fast-marching algorithms, which are an extension of the seeded region-growing approach that incorporate an adaptive threshold defined as the average of all voxels currently accepted as part of the vessel tree, are able to be used in one example to identify voxels in the 3-Dimensional image data that indicate vessels. The value of the adaptive threshold decreases as the traversal extends distally toward small vessels that typically have reduced image intensity due to the voxel partial volume effect. In fast-marching algorithms, generally the next brightest among all remaining candidate voxels is accepted as the centerline point within a vessel branch segment, the average threshold is updated, and the next set of candidates is evaluated. The algorithm to determine adaptive threshold values is adapted to prevent the identified vascular region from "leaking" into the background tissue, such as by including a fixed minimum threshold or a limit to the total number of voxels that can be incorporated into the final vessel tree.

Identifying the connected vessel components of interest from the masked CT image stack in one example uses a fast-marching approach after a manual selection of a seed point near the root of one of the vessel trees of interest. The fast-marching search is stopped when either a maximal voxel count is reached or when no neighboring voxel has an intensity value within the difference threshold to the running average. In one example, a maximum voxel count of 3,000,000 is used and has been observed to be sufficiently large to capture the vascular structure presented for a subject. The root in one example is defined as a large vessel that is clipped near the heart during the above described lung-volume extraction. In one example, the locations of voxels along the centerline of the connected vessels are identified by using the Skeletonize 3D plug-in created for NIH ImageJ by I. Arganda-Carreras and based on a 3D thinning algorithm by Lee et al. See, T. C. Lee, R. L. Kashyap and C. N. Chu, "Building Skeleton Models via 3-D Medial Surface Axis Thinning Algorithms," CVGIP: Graphical Models and Image Processing 56, 462-478 (1994).

After the above described initial threshold processing and region-growing steps are performed, processing is performed in one example to correct for potential anomalies caused by isolated black pixel(s) that are located within an otherwise solid white vessel mask. These isolated black pixel(s) can cause the skeletal centerline to appear to diverge (i.e., to split) around those enclosed black pixel(s). This divergence is able to cause an anomalous labeling of branches and bifurcations occurring within the affected vessel. In one example, this condition is corrected by performing an image closing operation using a 1.1 pixel in diameter disk element for 2D images, or a corresponding 1.1 voxel spherical element for 3D images, to remove the small patches of black pixels (i.e., holes) connected to the outside of the lumen through a voxel corner. Holes located entirely within the vessel lumen are removed in one example via a 3-step process: (1) gray-scale inverting of the image; (2) flood-filling the region outside of the vessels while recording the filled-in voxels, thus generating an image consisting only of the filled-in pixels; and (3) inverting the image. This technique labels any pixel that is not part of the region outside the vessel as belonging to the vessel.

The vascular model definition process 200 proceeds in one example by defining, at 206, a vascular tree structure by iteratively defining branch segments and bifurcation points of the vascular tree structure based on traversing of the vascular tree images captured within the received 3-Dimensional medical image data. An example of a vascular tree structure that is defined by the initial portion of the vascular model definition process 200 is a data structure stored within a computer that identifies each vascular branch segment, each bifurcation point, and also indicated a hierarchy of branch segments in the vascular tree.

Figure 4:
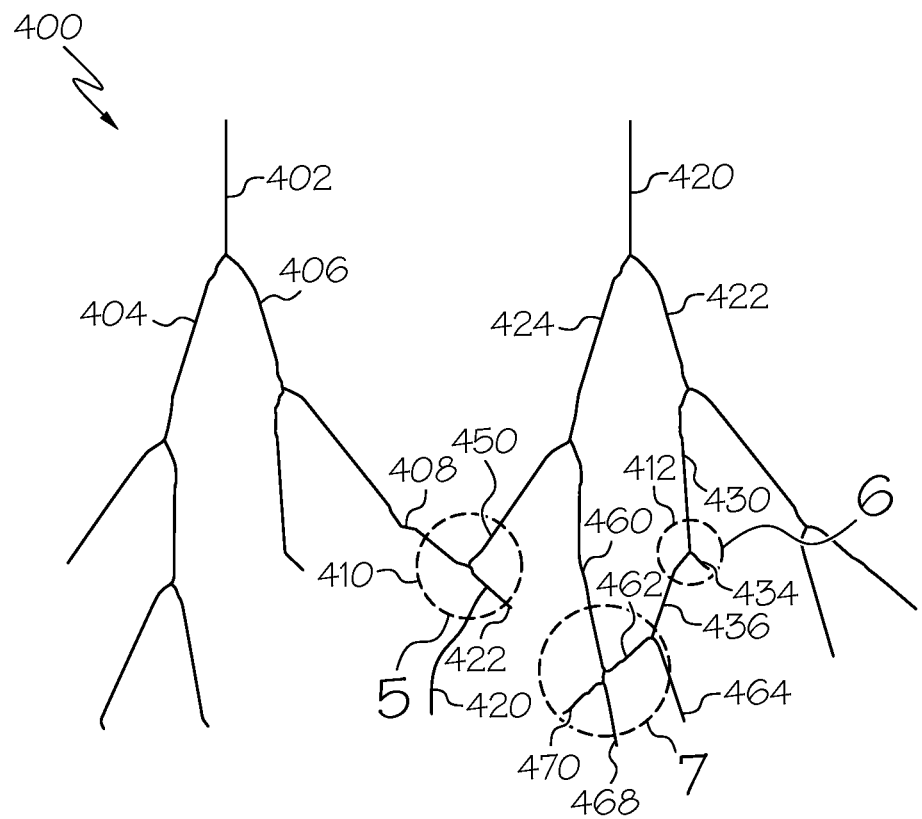
FIG. 4 illustrates a vascular model, according to an example.

A representation of a vascular model defined by such a vascular tree structure is illustrated in FIG. 4, which is described in further detail below. The vascular tree structure in one example is defined by a tree traversal and labeling process. The tree traversal and labeling process starts from a seed point location that is selected manually in an example, and a closest centerline voxel to that seed point is then found. After finding the closest centerline voxel to the selected seed point, the most likely location of the top root point is found by traversing the skeleton in both directions.

The top root point of the vascular tree structure is identified based on identification of the presence of bifurcating branches and the radius of each branch given the expectation that the true root point is at the end of the branch with the largest radius. The tree traversal then proceeds down the vascular tree skeleton from the determined top root point. In one example, a data structure, referred to in this example as a VesselTree data structure, is defined for each vascular branch segment identified within the 3-Dimensional medical imaging data. The vascular tree structure is therefore constructed of a number of VesselTree data structures arranged in a hierarchical tree structure corresponding to the vascular tree captured in the 3-Dimensional medical imaging data.

The first VesselTree data structure in one example holds the location of the top root point and centerline points defining each point in the first branch of the vascular tree. Each VesselBranch data structure in this example also stores an index to the parent and child branches that are on the other side of bifurcation points located at the respective ends of that branch segment. Branch segments are defined in the vascular tree by adding center line points of each branch traversed in the 3-Dimensional medical imaging data, such as by the fast marching process discussed above, until a bifurcation point is identified. At each bifurcation point encountered while traversing the vascular tree, a new VesselBranch data structure is defined for each child branch extending from that bifurcation point. This new VesselBranch data structure is populated with the first point of the new branch. The first point of this new branch segment is used for the detection of anomalous connections, as is described below. Traversal down each child branch segment is performed independently, and more than 2 children branch segments are permitted from a single bifurcation point.

The radius of each branch segment is then determined, at 208. In one example, an initial estimate of vessel radius is based upon a 3-Dimensional Euclidean distance transform, in mm units, on the extracted, binary vessel image. In some examples, the values of a resulting distance map at each centerline voxel are evaluated after the 3-Dimensional Euclidean distance transform is performed.

The upstream and downstream branch segments are then determined for each bifurcation point, at 210. In one example, the upstream, or parent, branch is determined based upon an assumption that the upstream branch has a radius that is larger than downstream, or child, branches. Based upon the determination of upstream and downstream branches at each bifurcation point, a vascular tree structure is able to be constructed and validated.

Erroneous bifurcation points are determined, at 212. As described in further detail below, erroneous bifurcation points are identified based on criteria such as: 1) a branch of a bifurcation point being also assigned to another vascular sub-tree; 2) based upon the length of a downstream, or child, branch segment relative to the radius of the upstream, or parent, branch segment of a bifurcation point; or 3) other criteria. Once erroneous bifurcations points are identified, erroneous interconnections between branches and neighboring vessel trees are determined and corrected, at 214. The determination and correction of erroneous interconnections is described in further detail below.

Erroneous interconnections, such as bifurcation points erroneously identified in the 3-Dimensional image data, occur due to factors such as image data that has large through-plane voxel dimensions (i.e., relatively thick image slices) and also due to motion of the subject during imaging. These factors can lead to false apparent connections between neighboring but independent vascular trees. Illustrations of image portions depicting such error inducing characteristics are described below along with a description of processes used to correct these errors in determined vessel tree structure models.

FIG. 4 illustrates a vascular model 400, according to an example. The vascular model 400 is determined in one example by the vascular model definition process 200, described above with regards to FIG. 2. The vascular model 400 includes two sub-trees, a first sub-tree starting with a first root branch segment 402, and a second sub-tree starting with a second root branch segment 420. In an example, the user selects a seed point at the top of each of the root branch segments, and the tree traversal proceeds down the respective root branch segment to a respective first bifurcation point. In the instance of traversing the first sub-tree, the traversing proceeds down the first root branch segment 402 until a bifurcation point is reached identifying a first left branch 404 and a second left branch 406. The traversal of the first sub-tree proceeds as described above to identify each branch segment in that sub-tree. The second sub-tree is similarly traversed, starting at the user selected seed point at the top of the second root branch segment 420 and identifying a bifurcation point where the second root branch segment 420 splits into the first right branch segment 424, and the second right branch segment 422. The traversal of the second sub-tree also proceeds as described above to identify each branch segment in that sub-tree.

The vascular model 400 includes a number of erroneously identified bifurcation points. For example, the bifurcation points shown within Box A 410 and Box C 414 only appear to be junctions of vessels but are really only locations of vessels that pass near one another without joining. Box A 410 indicates a location where the right tree distal branch segment 450 appears to be a parent branch segment splitting into two child branch segments indicated by the left tree branch segment 408. In fact, Box A indicates a location where right tree distal branch segment 450 ends near the separate left tree branch segment 408. Box C 414 indicates a location where two vessels cross near each other but do not join. The vessels indicated by the right branch segment 462 and the left branch segment 468 are the same continuous vessel, and the top branch segment 460 and the lower branch segment 470 are similarly the same continuous vessel.

In the case of the erroneous bifurcation point depicted in box C 414, the apparent bifurcation point joins two branches of the same sub-tree, which starts with the second root branch segment 420. In that example, as that sub-tree is traversed, top branch segment 460, which splits from the bifurcation point where first right branch segment 424 splits into right tree distal branch segment 450 and top branch segment 460, will lead to the erroneously identified bifurcation point where top branch segment 460 appearing to split into left branch segment 468 and right branch segment 462. As the traversal proceeds along right branch segment 462, branch segments will be encountered up through second right branch segment 422 and its bifurcation point with second root branch segment 420 and first right branch segment 424, thus forming a "loop" within this sub-tree. In this event, the traversal encountering second right branch segment 422 will note that second right branch segment 422 is already assigned as part of this sub-tree, as it was marked upon the first encounter of this bifurcation point when traversing from second root branch segment 420. This noted "loop" indicates that an anomalous crossing, or erroneously identified bifurcation point, has been encountered along the path. In one example, the vascular tree is then retraced from the looped-to second right branch segment 422 to identify where the anomalous crossing occurred and thereby identify that anomalous crossing as an erroneously identified bifurcation point that is to be corrected.

Figure 5:
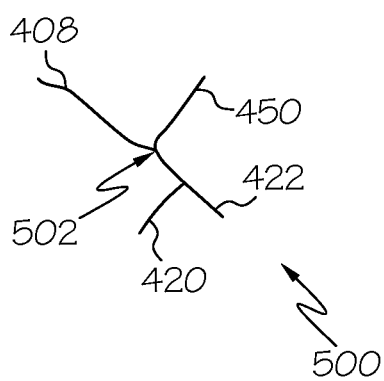
FIG. 5 illustrates a branch segment erroneously ending in a neighboring sub-tree, according to an example.

FIG. 5 illustrates a branch segment erroneously ending in a neighboring sub-tree 500, according to an example. The branch segment erroneously ending in a neighboring sub-tree 500 corresponds to box A 410 portrayed in the vascular model 400 and depicts a bifurcation point that correctly identifies a point where a left tree branch segment 408 splits into a left child branch segment 424 and a right child branch segment 422. Additionally, the branch segment erroneously ending in a neighboring sub-tree 500 depicts an erroneously identified bifurcation point 502 where the left tree branch segment 408 appears to split into a right tree distal branch segment 450. As described below, this erroneous bifurcation point is identified based upon the observation that left tree branch segment 408 has substantially the same radius on both sides of the erroneously identified bifurcation point 502, and that the radius of the right tree distal branch segment 450 is not consistent with a bifurcation point what would correspond to a split of a branch segment that has an upstream radius of the left tree branch segment 408.

Figure 6:
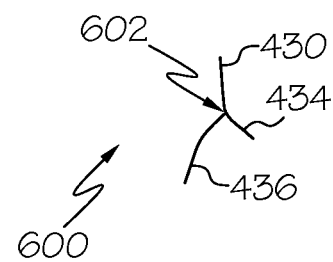
FIG. 6 illustrates a correctly identified bifurcation point, according to an example.

FIG. 6 illustrates a correctly identified bifurcation point 600, according to an example. The correctly identified bifurcation point 600 corresponds to box B 412 portrayed in the vascular model 400. The correctly identified bifurcation point 600 has a parent branch segment 430 that splits into a first child branch segment 436 and a second child branch segment 434 at a bifurcation point 602. In this example of a correctly identified bifurcation point, the radius of the parent branch segment 430 is larger than the radius of either the first child branch segment 436 or the second child branch segment 434.

Figure 7:
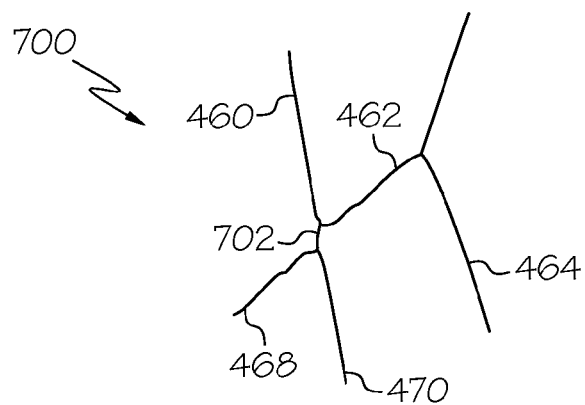
FIG. 7 illustrates an erroneous branch segment crossing bifurcation, according to an example.

FIG. 7 illustrates an erroneous branch segment crossing bifurcation 700, according to an example. The erroneous branch segment crossing bifurcation 700 depicts geometric features used to identify and correct an erroneous bifurcation point based on an apparently anomalous branch segment crossing. The erroneous branch segment crossing bifurcation 700 illustrates a portion of the vascular model 400 of FIG. 4 that is within box C 414 of that figure. The actual structure of the vessels depicted in this portion of the image data is that two vessels cross at this apparent bifurcation point but do not actually join there. In particular, a top branch segment 460 continues on to a lower branch segment 470 and a right branch segment 462 continues on to a left branch segment 468. The images of these two branch segments occupy common voxels at, and create an image of, an erroneous child branch segment 702. At a location on the right branch segment 462 that is upstream from the erroneous child branch segment 702, an additional branch segment 464 branches at an upstream bifurcation point.

Figure 8:
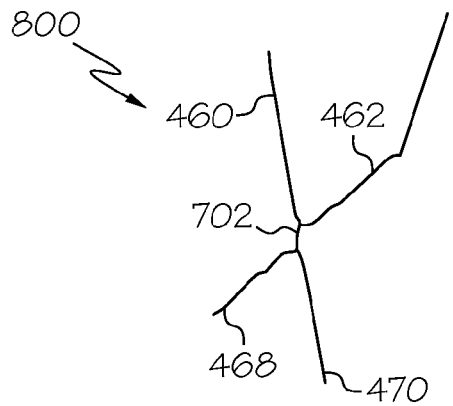
FIG. 8 illustrates an erroneous bifurcation point geometry, according to an example.

FIG. 8 illustrates an erroneous bifurcation point geometry 800, according to an example. The traversal of this portion of the vessel tree, as performed by the vascular model definition process 200 described above, initially proceeds along the top branch segment 460 in a downward direction in this figure. The erroneous bifurcation point is depicted as the parent branch segment's 460 entering into a bifurcation point and splitting into a right branch segment 462 and an erroneous child branch segment 702. The erroneous child branch segment 702 then splits at a second bifurcation point into a lower branch segment 470 and into a left branch segment 468.

The traversal processing in this example compares the length of the erroneous child branch segment 702 to the radius of the top branch segment 460. In one example, the short length of the erroneous child branch segment 702 relative to the radius of the top branch segment 460 is an indication that this is an erroneously identified bifurcation point. Based on the short length of the erroneous child branch segment 702, the processing of one example removes the segments corresponding to the erroneous child branch segment 702 from the vascular model.

Figure 9:
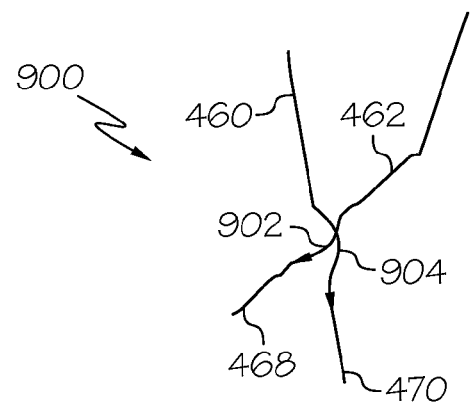
FIG. 9 illustrates a modified vascular model portion, according to an example.

FIG. 9 illustrates a modified vascular model portion 900, according to an example. The modified vascular model depicts the erroneous bifurcation point geometry 800 after omission of points within the crossing region. A first curved arrow 902 and a second curved arrow 904 illustrates the true connections between the remaining branch segments. The second curved arrow 904 denotes where the continuous top branch segment 460 and the lower branch segment 470 jumps over the crossing to connect to their respective distal segments. The first curved arrow 902 represents a similar jump for the right branch segment 462 and left branch segment 468. It is noted that the left branch segment 468 extends along a trajectory that has a direction within a +/−15 degree solid angle about the trajectory of the top branch segment 460. The correction of the of the erroneous bifurcation point is further based on the observation that the left branch segment 468 is approximately parallel to the trajectory of the top branch segment 460, because the solid angle between these two trajectories is less than +/−15 degrees. Because these two branch segments are approximately parallel, the processing assumes they are images of the same vessel and the model is corrected to reflect that relationship. In the following discussion, two identified branch segments that are able to be determined to be part of a single, continuous branch segment are referred to as "disjoint branch segments." In this example, the two disjoint branch segments identified based upon the solid angle between the trajectories of the two identified branch segments. In further examples, other criteria support the identification of disjoint branch segments, such as their radii being approximately equal.

Figure 10:
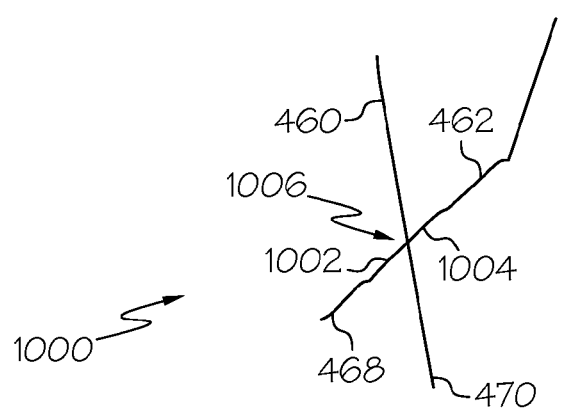
FIG. 10 illustrates a corrected vessel crossing point, according to an example.

FIG. 10 illustrates a corrected vessel crossing point 1000, according to an example. The corrected vessel crossing point 1000 depicts a corrected portion of the vascular model 400 after the processing depicted above with regards to FIGS. 7 through 9. The corrected vessel crossing point 1000 depicts the top branch segment 460 and lower branch segment 470 joined by a first repair segment 1002, and the right branch segment 462 and left branch segment 468 joined by a second repair segment 1004. These two repair segments are identified in the vessel structure model as not joining, i.e., not having a bifurcation, at the intersection 1006.

Due to the nature of the skeletonization operation, whereby center line voxels of a vessel are identified to initially construct a vascular model, a branch segment entering a location near an erroneously identified crossing bifurcation can exhibit a marked and inappropriate apparent change in trajectory, e.g., the illustrated angles between top branch segment 460 and the right branch segment 462 is not what would be expected for a true vessel bifurcation. The end-branch trajectory is computed to ensure that the continuation of branches at a crossing is identified correctly; hence, the skeletal points falling within the mask of the crossing are omitted from each branch (as evident by the gaps created in the crossing branches top branch segment 460, lower branch segment 470, right branch segment 462, and left branch segment 468). Having identified which grandchild matched with the parent branch, a hyper-skeleton pair data structure, such as for the first repair segment 1002 and the second repair segment 1004, is defined in one example to permit subsequent tree traversals to jump from the last parent vessel skeleton point (such as from the top branch segment 460, over the crossing region to the first non-omitted point in the grandchild branch, such as to the lower branch segment 470. An analogous hyper-skeleton pair is defined for the right branch segment 462 and the other grandchild branch segment left branch segment 468, with the second repair segment 1004.

In contrast to reallocating branch segments and modifying the existing tree structures, a more robust approach is used in some examples that erases the current tree structure(s) in an area of an identified erroneous bifurcation, as illustrated in FIG. 9 above, and then re-traverses the vascular tree structure within the 3-Dimensional medical images from the seed point near the original top root point, re-traversing and re-labeling each branch segment of the vessel tree depicted in the 3-Dimensional medical images. The hyper-skeleton pairs prevent traversal into the crossing branch while connecting the proximal and distant portions of each crossing branch, as is illustrated in FIG. 10.

Identification of erroneous bifurcations points in one example includes determining that an identified bifurcation point is really an instance of the image traversal processing incorrectly determining that a branch segment of one sub-tree is crossing onto a branch segment of an adjacent sub-tree and thereby appears to form a bifurcation. Such aberrant crossings occur, for example, when two adjacent branch segments occupy the same voxel in the 3-Dimensional medical image data, thereby giving the appearance that the branch segments are connected. Since the detection of such anomalous connections is able to occur at points in the vascular tree that are below an erroneously identified bifurcation within the tree structure, the path in the vascular model to the erroneously identified bifurcation appears to move "upwards" in the tree structure from smaller child branches to their larger parent branches, rather than downwards in the tree structure, as might be expected. Therefore, the branch segment entering an erroneously identified bifurcation point is identified by back-tracing the vascular model from the detected erroneous bifurcation point to identify a child branch segment of a "lower" bifurcation point in the tree of the vascular model whose radius is correctly identified as being smaller than its labeled parent at that lower bifurcation point. The bifurcation point at the end of that child branch segment that is opposite that lower bifurcation point is then the erroneously identified bifurcation point.

In one example, the processing identifies erroneously identified bifurcation points that occur under three possible scenarios: (1) where the branch segments appear to cross each other in the imaging data but do not really intersect; (2) where the traversed "from" (i.e., parent) branch segment appears to end at the junction of the two branch segments; or (3) the where the traversed "to" (i.e., child) branch segment appears to end at the junction of the two branches. The processing in one example back-traverses the affected branch segment sub-tree from the point where it meets with the first point on the second branch to identify the location where two branches cross.

Erroneous bifurcation points that correspond to two branch segments crossing, such as is depicted above in FIG. 7, are identified based on several observed characteristics. Where two vessel sub-trees cross, it has been observed that the sub-trees merge with several predictable features. Such an erroneous bifurcation point is often present in processed vascular models when processing 3-Dimensional medical imaging data under conditions where: one child branch from a first bifurcation point again bifurcates after a short distance relative to the parent vessel's radius. In this discussion, a "grandchild" branch segment of a parent branch segment refers to a branch segment that is downstream from and removed from the parent branch segment by two bifurcation points that are separated by a child branch segment of the parent branch segment. For example, the lower branch segment 470 illustrated above is a grandchild branch segment of the top branch segment 460.

In the case of identifying a relatively short child branch segment, relative to the radius of the parent branch segment, an erroneous bifurcation point often has one of the grand-children branch segments with a trajectory that is approximately parallel to the trajectory of the parent branch segment, such as is depicted above in the relationship between the top branch segment 460 and the lower branch segment 470. Further, the other grandchild, e.g., the left branch segment 468, is also approximately parallel to the other child branch of the first bifurcation point from the parent branch segment, e.g., the left branch segment 468 is approximately parallel with the right branch segment 462. It has been observed that a solid angle difference within +/−15 degrees between branch segments is an effective measure of determining that two branch segments are sufficiently parallel to assume that the two branch segments are portions of one, continuous branch segment. Therefore, a test to determine if two separated branch segments are approximately parallel in order to correct an erroneously identified bifurcation point is satisfied when the solid angle between the two branch segments is within +/−15 degrees.

In a further example, correction of an erroneously determined bifurcation point is able to base determining that two branch segment images are part of a single vessel upon a function of the sold angle between the axis of the branch segments and the length of a "short" branch segment connecting them. The solid angle between two branch segments is the arccosine of the dot product of the vectors defining the trajectory of the two branch segments. The solid angle (A) is given by the following equation:

$$A = a \cos(Va \cdot Vb)$$

Where (Va) is the vector defining the trajectory of the axis of a parent branch segment and (Vb) is a vector defining the trajectory of the axis of a grandchild branch segment.

A child branch was deemed to bifurcate after a short distance when its branch length (L) was less than twice the parent branch radius (R) divided by the sine of the solid angle difference between the parent and child branch trajectories (i.e., the oblique distance across the center of the parent branch mask). The basis for determining that a "short" branch segment indicates an erroneous bifurcation point is thus able to be determined based on satisfying the following inequality:

$$L < (2*R)/\sin(A)$$

Like the solid angle of 15 degrees, this distinction for a quick bifurcation was found empirically and proved useful in multiple test cases.

In addition to correcting erroneously identified bifurcation points that are really images of branch segments that cross near each other, erroneously identified bifurcation points that are really images of one branch segment that appears to terminate into another branch segment are also identified and corrected. An example of a branch segment of one tree appearing to terminate into another is illustrated above in FIG. 5. Erroneously identified bifurcation points that are really one branch segment appearing to terminate onto another are corrected in a manner analogous to that described above that is used to correct erroneously identified bifurcation points that are really a crossing of two branch segments.

In the case of erroneously identified bifurcation points that are really images of one branch segment that appears to terminate into another branch segment, one of the children branch segments is either found to be nearly parallel to and of the same radius as the parent branch segment or, if the parent branch segment of the erroneously identified bifurcation point is the terminating branch, the 2 sibling branch segments are approximately parallel and of approximately the same radius. It has been empirically determined that two branch segments at a bifurcation point that have less than a 20% deviation in branch radii and a solid angle difference within +/−15 degrees are able to be identified as disjoint branches, i.e., they are two matching branches across a terminus or in other words are the same branch segment and there is no actual bifurcation at the apparent juncture of the vessels.

The correction of erroneously identified bifurcation points where one branch segment appears to terminate into another branch segment is performed in a manner similar to that described above for correcting erroneous bifurcations that are the result of branch segments crossing near one another but only appearing to form a juncture. In particular, skeletal points of the vessel tree in the region of the apparent bifurcation point are removed and a hyper-skeletal pair is defined to bridge the resulting gap to join the two approximately parallel branch segments on either side of the erroneously identified bifurcation point. After the hyper-skeleton pair to join the two approximately parallel branch segments is created, the data structure defining the vessel tree is erased, and the 3-Dimensional medical images are traversed again starting at the original top root point. The process of removing false crossings and termini (with subsequent tree traversal and relabeling) is repeated until all aberrant within-tree connections are corrected.

Some erroneously identified bifurcation points appear to be connections between adjacent vascular sub-trees, such as is depicted within Box A 410, illustrated in FIG. 5 and discussed above. Connections between adjacent vascular sub-trees do not appear as a loop when the vascular images are being traversed, i.e., the incorrectly identified child branch segment is not already identified as a branch segment of a sub-tree. Such erroneously identified bifurcation points are detected by looking for characteristic features of the labeled vascular tree that would be consistent with erroneously identified bifurcation points. The two features of the labeled vascular tree that indicate an erroneously identified bifurcation point are 1) a child branch segment from the bifurcation point that has a radius larger than the radius of the parent branch segment, and 2) a large solid angle of separation between two children branch segments. As with an erroneously identified bifurcation point apparently indicating a connection of adjacent branch segments within the same sub-tree, the path onto and up an erroneously identified bifurcation point indicating a connection between sub-trees goes from small child branch segments up to their larger parent branch segments rather than down a tree structure, as expected. Moreover, because the parent and child are mislabeled, the angle between the trajectories (i.e., the bifurcation angle) of the mislabeled children is greater than 90 degrees.

In example of such an erroneously identified bifurcation point is illustrated in FIG. 5. FIG. 5 is a portion of the vascular model depicted in FIG. 4. FIG. 4 depicts two vascular sub-trees, one beginning with first root branch segment 402 and another beginning with second root branch segment 420. When traversing the sub-tree beginning with second root branch segment 420, the right tree distal branch segment 450 appears to be a parent branch segment entering the bifurcation point 502, and splitting into the left tree branch segment 408 and the second right branch segment 422. The angle between the left tree branch segment 408 and the second right branch segment 422 is much larger than would be expected for a bifurcation point in a correctly labeled tree. It has been empirically determined that a separation angle of greater than 110 degrees between children branch segments at a bifurcation point correctly identifies an incorrectly traversed vessel tree structure. Having identified a bifurcation point as an erroneously identified bifurcation point, the vascular model is corrected using the same procedure outlined above for erroneously identified bifurcations indicating connections within a sub-tree. The top root point of the new tree is found by searching up from the distal side of the child branch segment at the erroneously identified bifurcation to a branch segment with the largest radius. Both data structures defining the vascular model is erased after the sub-trees are separated, and each sub-tree is re-traversed.

Figure 3:
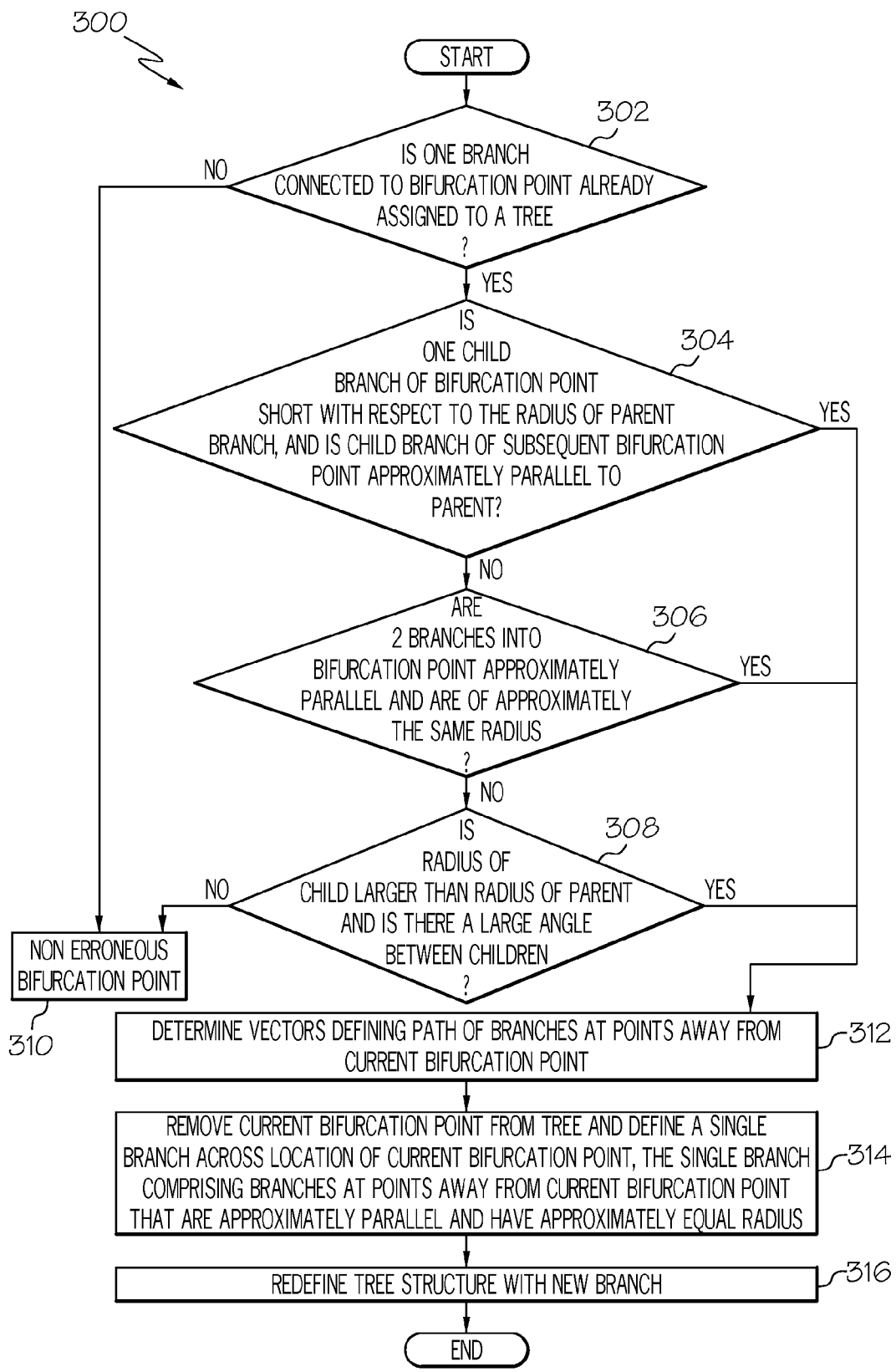
FIG. 3 illustrates an erroneous bifurcation point and interconnection identification and correction process, according to an example.

FIG. 3 illustrates an erroneous bifurcation point and interconnection identification and correction process 300, according to an example. With reference to FIG. 2, described above, the erroneous bifurcation point and interconnection identification and correction process 300 is an example of processing to perform the erroneous bifurcation point determination 212 and the determination of and correction of erroneous interconnection between branches and neighboring vessel trees 214. In general, the erroneous bifurcation point and interconnection identification and correction process 300 is able to be performed in conjunction with determining the vessel tree structure definition data by processing 3-Dimensional medical imaging data, as is described below. In further examples, the erroneous bifurcation point and interconnection identification and correction process 300 is able to be applied to vessel tree definition data that has already been at least partially produced by determining the vessel tree structure for at least a portion of a subject depicted in 3-Dimensional medical imaging data, as is described above.

An example of the erroneous bifurcation point and interconnection identification and correction process 300 described below is performed in conjunction with traversing the 3-Dimensional image data to determine vascular tree structures, as is described above in the vascular model definition process 200. The following discussion refers to the vascular model 400, discussed above with regards to FIG. 4, and the detailed portions illustrated in FIGS. 5-10, as an example of a vascular model that includes erroneously identified bifurcation points which are identified and corrected.

The erroneous bifurcation point and interconnection identification and correction process 300 begins by determining, at 302, if one branch segment connected to a bifurcation point is already assigned to a tree. In an example, as this determination is made in conjunction with the vessel tree structure definition 206 described above. In this example, the process tracks whether a centerline voxel of a branch of a newly identified bifurcation point is already defined as being part of a traversed branch.

In this example, an anomalous branch connection within a tree is identified as an instance where the next point to be added to a branch is already allocated as the first point in another branch that is defined, but may not have yet been traversed. In one example, branch segments identified as anomalous branch segments are added to a list of anomalous branch connections, i.e., erroneously identified bifurcation points, to be subsequently corrected. Traversal of the branch segment that is already assigned to a vessel tree in this case is halted but traversal does continue for all other remaining child branch segments. If the centerline voxel of a branch segment of a newly identified bifurcation point is already defined as being part of a traversed branch determination is false, the bifurcation point is identified as being non-erroneous, at 310. This processing continues in one example along with the traversal of the vessel tree structure until all branches are traversed. It is to be noted that after the received 3-Dimensional medical image is process and the identified vascular image components are all traversed, all identified branch segments are associated with only one VesselTree data structure.

If the centerline voxel of a branch segment of a newly identified bifurcation point is already defined as being part of a traversed branch determination is true, a determination is made to determine if one child branch of bifurcation point short with respect to the radius of parent branch, and is child branch of subsequent bifurcation point approximately parallel to parent, at 304. If this determination is false, a determination is made to determine if two branch segments into a bifurcation point are approximately parallel and are of approximately the same radius, at 306. As described above, in one example, branch segments at points away from current bifurcation point that are determined to be approximately parallel if a solid angle between their vectors is within +/−15 degrees and have approximately the same radius if their radii are within 20% of each other. If this determination is false, a determination is made to determine if the radius of child larger than radius of parent and is there a large angle between children, at 308. If that determination is false, the bifurcation point in one example is identified as being non-erroneous, at 310. In further examples, other tests are able be used to determine if a bifurcation point has been erroneously identified.

If any of the above three determinations are true, a vectors are determined, at 310, of branch segments at points away from the current bifurcation point. Vessel branch elements in the area of the current bifurcation point are then removed, at 312, from the vascular model and a single branch segment across the location of current bifurcation point is defined. That single branch segment comprises branch segments at points away from the current bifurcation point that are approximately parallel and have approximately equal radius. As described above, in one example, branch segments at points away from current bifurcation point that are determined to be approximately parallel if a solid angle between their vectors is within +/−15 degrees and have approximately the same radius if their radii are within 20% of each other. A tree structure is then redefined using the newly defined single branch segment. The process then ends.

After correctly identifying and labeling potentially multiple trees, the parameters determined for the vascular model support the direct computation of the radius and length of each branch segments; determination of the maximum number of branch segment generations; number of branch segments; and the composite metrics, such as the histogram of branch segment radii. In one example, the computation of metrics is able to exclude branch segments with fewer than 3 centerline points because those are assumed to represent artifacts from the initial thresholding step and/or the presence of noise or artifacts in the original CT images. In one example these short branch segments are simply deleted. The average branch segment radius is able to be computed by taking an average over all centerline points of the 3D distance map evaluated at each point.

In one example, the vascular model is able to be refined for certain purposes, such as for displaying of the vascular model, by fitting the centerline of each branch segment to a smooth curve comprised of up to 3 one-dimensional high-order finite elements. Such fitting is able to be realized by defining a pair of bounding nodes for each element, and each node holds both its 3D position and the slope of the curve through that position. Using the smoothed centerline representation and the average radius for each branch segment, a 3D simulation of the vessel tree structure is able to be generated and each independent tree is able to be assigned, for example, a unique color for display.

A vascular model determined according to techniques described above, as well as vascular models determined by any other suitable techniques, are able to be refined to better correspond to the vascular structures captured within 3-Dimensional imaging data. In one example, a 3-Dimensional vascular volume model is created and iteratively adjusted to maximize similarity metrics between the model and the vascular structures captured within the imaging data.

Figure 12:
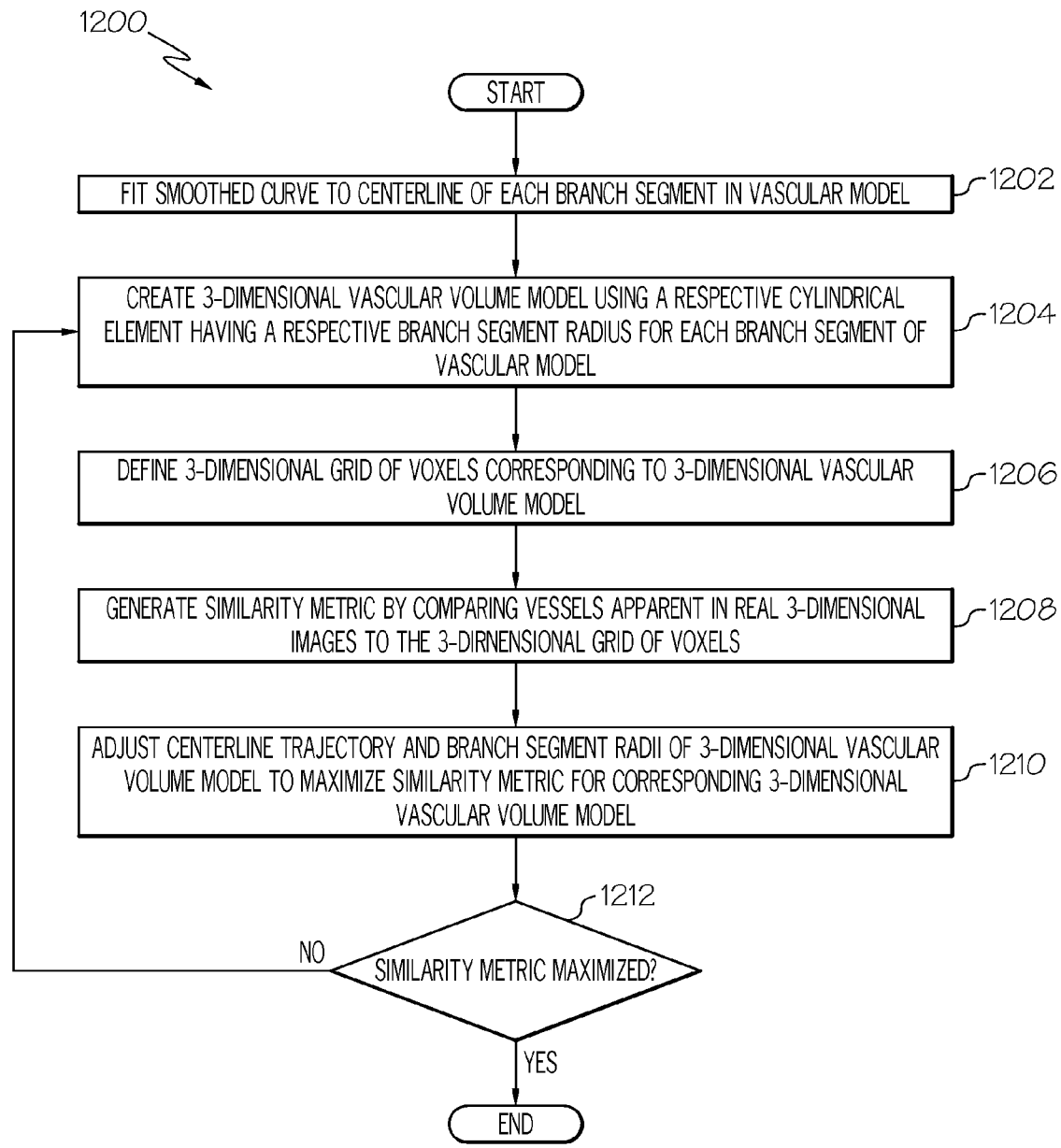
FIG. 12 illustrates a vascular volume model creation process, according to an example.

FIG. 12 illustrates a vascular volume model creation process 1200, according to an example. The vascular volume model creation process 1200 begins by fitting, at 1202, a smoothed curve to the centerline of each branch segment in the vascular model. After determining the smooth curve to fit the centerline of each branch segment, the vascular model for each branch segment is made to resemble the full 3-Dimensional anatomy of a vessel branch in one example by defining the radius along the branch segment center and creating a 3-Dimensional model of the tubular surface that is created by imposing the branch segment radius as a cylindrical element along the branch segment centerline, at 1204. In one example, each cylindrical element has a radius that corresponds to an observed radius of the vascular structure detected within the 3-Dimensional imaging data. For example, the initial radius of each cylindrical element is based upon an estimated radius of the corresponding vessel observed in the imaging data.

In one example, for each branch segment the branch segment radius is defined to have a constant value along the entire branch segment. Other models for the branch segment tubular structure include having the branch segment radius decrease monotonically in value along the length of the branch segment, or having the radius either remain the same, increase or decrease from point to point along the centerline.

After determining the smooth curve to fit the centerline of each branch segment and the radius along the centerline of the branch segment, a 3-Dimensional vascular volume model is defined or created to reflect the appearance of the collection of vessel branch segments on consecutive slices of a 3-Dimensional medical image set.

In one example, the appearance of the collection of vessel branch segments is generated by defining, at 1206, a 3-Dimensional grid of voxels wherein each voxel has the same dimensions and locations of the voxels used to generate the subject's 3-Dimensional medical image. For each voxel in the grid, the pixel brightness intensity is determined.

In one example, the appearance is generated using the partial volume effect wherein each voxel that is entirely enclosed within the vascular model is given a white intensity value (largest possible value; typically 255 for a medical image); each voxel that is entirely located without the vascular model is given a black intensity value (lowest possible value; typically 0); and for each voxel that has a portion of it's volume located within the vascular model and a portion lying outside the vascular model the intensity value is set proportional to the percentage of the voxel volume that is lying within the vascular model.

The set of images for the appearance of the vascular model are then compared with the real images from the subject and a similarity metric describing the wellness of the comparison is generated, at 1208.

In one example, the images are compared using the normalized cross correlation coefficient generated by comparing the pixel intensity values on a pixel-by-pixel basis over all pixels in each image and then computing the statistical R-value for the wellness of the comparison to generate the similarity metric. Increasing the similarity metric in this context refers to increasing the correlation between the 3-Dimensional vascular volume model and the vessels observed in the imaging data. Maximizing the similarity metric refers to adjusting one or more parameters in directions that increase the similarity metric until further adjustments result in a decrease in the similarity metric.

Using the metric that describes the similarity between the images for the appearance of the vascular model and the images of the subject's scan, the model parameters that determine the trajectory of the centerline of each branch segment and the parameters that determine the branch segment radius along the branch segment centerline are adjusted to achieve a maximum of the similarity metric, at 1210. The parameters of the 3-Dimensional vascular volume model are iteratively adjusted, including according to the adjustments described below, to maximize the similarity metric, as determined at 1212. Maximizing the similarity metric includes, in one example, iteratively performing the following for each adjusted parameter value: redefining that 3-Dimensional vascular volume model based on the adjusted parameters, at 1204, redefining the 3-Dimensional grid, at 1206, and regenerating the similarity metric characterizing the similarity between the 3-Dimensional vascular volume model and vascular images in the imaging data, at 1208.

In one example, when using a constant branch segment radius along a branch segment centerline, the modeled radius value is increased (or decreased) slightly. A new set of appearance images for the vascular model is generated, at 1206. An updated metric for the similarity between the new appearance images and the images in subject's scan is generated, at 1208. A comparison between the prior value of the similarity metric and the updated value is made. If the updated metric value is greater, then this new radius value is kept as the new, accepted estimate for the branch segment radius and a new test radius is generated that is yet larger (or smaller) than the newly accepted estimate for the radius. If the similarity metric is lesser, then instead of the test radius being larger (or smaller) the new test radius is made to be slightly smaller (or slightly larger) than the currently accepted radius estimate.

As is well understood, varying parameters to increase a similarity metric is able to be applied to optimizing, e.g., maximizing, the similarity metric. Optimizing the similarity metric by iteratively varying parameters and of the 3-Dimensional vascular volume model in one example improves the estimate of the radius of each vascular branch segment used in the model, and correspondingly improves the analysis of the model to determine, for example, total volume of the vascular structures, changes in sizes and/or volumes of parts or of all of the vascular structure, and other data.

The vascular model parameters that achieve the maximum of the similarity metric constitute the improved estimate for the branch segment's centerline trajectory and branch segment's radius as a function of position along the centerline. In one example, the optimization of the similarity metric achieves an improved fitting of the radius of each branch segment in the 3-Dimensional vascular volume model to the structures observed in the imaging data.

Figure 11:
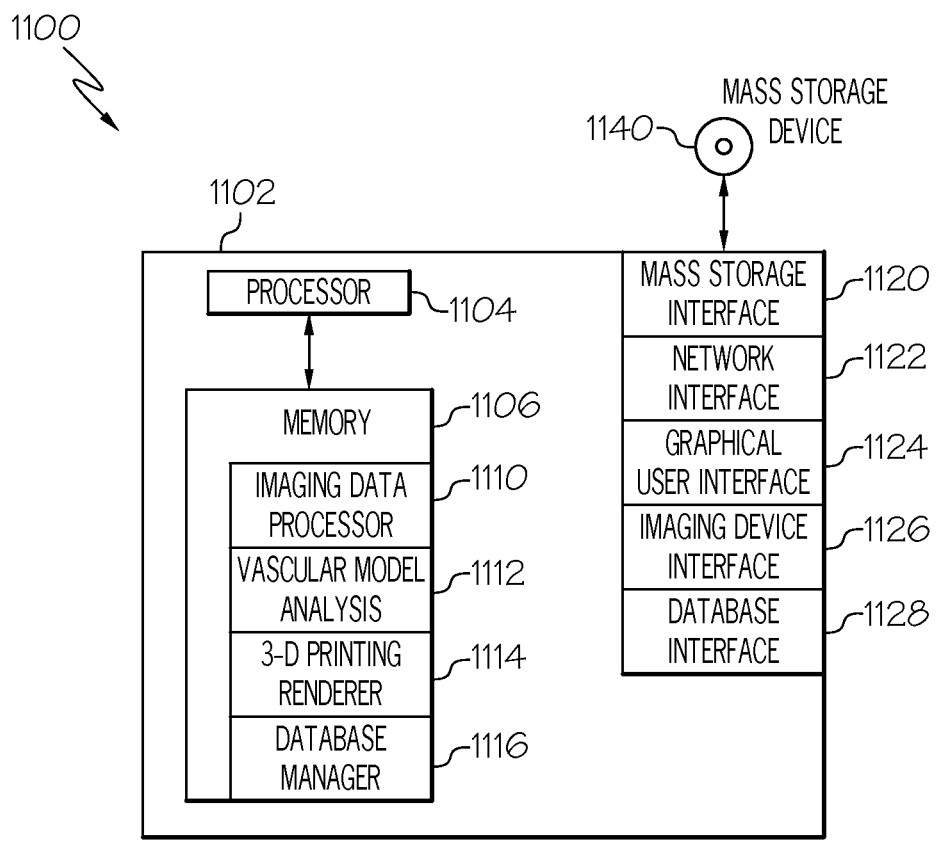
FIG. 11 is a block diagram depicting an example processing system suitable for implementing the above described methods.

FIG. 11 is a block diagram depicting an example processing system 1100 suitable for implementing the above described methods. Processing circuits as understood in this specification include a broad range of processors, including any variety of processing circuit or computer system that is located at a single location, or distributed over several identifiable processors. These several processors are further able to be collocated or physically dispersed within a local area or a geographically widespread area. Any suitably configured processing system is also able to be used as part of the above described systems and/or to perform part or all of the above described methods. The processing system 1100 has a computer 1102 that includes processor 1104 that is connected to a main memory 1106, mass storage interface 1120, network interface 1122, Graphical User Interface (GUI) 1124, an imaging device interface 1126, and a data base interface 1128, all of which are also included in the computer 1102 in this example. A system bus 1130 interconnects these system components.

Mass storage interface 1120 is used to connect mass storage devices, such as removable storage device 1140, to the computer 1102. One specific type of removable storage device is an optical disk drive, which may be used to store data to and read data from a CD 1140 in one example as a computer program product.

Main Memory 1106 contains software components tangibly stored as an imaging data processor program 1110, a vascular model analysis program 1112, a 3-D Printing renderer 1114, and a database manager 1116. Although illustrated as concurrently resident in main memory 1106, it is clear that these components are not required to be completely resident in the main memory 1106 at all times or even at the same time. Processing system 1100 is able to utilize conventional virtual addressing mechanisms to allow programs to behave as if they have access to a large, single storage entity, referred to herein as a computer system memory, instead of access to multiple, smaller storage entities such as main memory 1106 and removable storage device 1140.

Processor 1104 and memory 1106 also include an operating system (not shown), which is able to be a suitable multitasking operating system. The operating system includes a removable storage device interface management program to manage access through the removable storage device 1140. Embodiments of the present invention utilize architectures, such as an object oriented framework mechanism, that allows instructions of the components of operating system to be executed on any processor within the processing system 1100.

Although only one processor 1104 is illustrated for computer 1102, computer systems with multiple CPUs can be used equally effectively. Embodiments of the present invention incorporate interfaces that each includes separate, fully programmed microprocessors that are used to off-load processing from the processor 1104. Graphical user interface 1124 is used to exchange information with graphical user interface terminals (not shown) allow users to interact with the processing system 1100. The Graphical user interface 1124 is able to exchange data with user interface terminals that are able to be non-intelligent or fully programmable workstations that are used to allow system administrators and users to communicate with the processing system 1100.

Network interface 1122 is used to connect other computer systems or group members. Network interface 1122 is further able to be used to exchange program instructions and/or data to support new or improved operations in the processing system 1100. The present invention works with any data communications connections including present day analog and/or digital techniques or via a future networking mechanism.

The imaging device interface 1126 is used to exchange data with one or more 3-Dimensional medical imaging devices, such as a CT imaging device. The Data Base Interface 1128 is used to exchange data with one or more databases, such as databases used to store vascular models.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method for characterizing vascular anatomy depicted in 3-dimensional medical images, the method comprising:
    performing the following with a processor:
        iteratively identifying, based on traversing identified image elements within 3-Dimensional medical image data, respective identified branch segments within a plurality of identified branch segments of at least one vessel tree, each iteration identifying different respective identified branch segments;
        identifying, based on the traversing and the iteratively identifying respective identified branch segments, a plurality of identified bifurcation points, wherein each identified bifurcation point comprises at least a second identified branch segment splitting from the respective branch segment being traversed;
        determining a respective radius of each respective identified branch segment at points along the respective identified branch segment;
        identifying, at each respective candidate bifurcation point, a respective upstream identified branch segment and at least two respective downstream identified branch segments, wherein a respective radius of the respective upstream identified branch segment is greater than a respective radius of each of the at least two respective downstream branch segments;
        defining, based on the iteratively identifying respective identified branch segments, on the identifying the plurality of identified bifurcation points, and on the respective upstream identified branch segment, a vascular tree model corresponding to the plurality of identified branch segments and the plurality of identified bifurcation points;
        fitting a smoothed curve to a respective centerline of each identified branch segment in the vascular tree model;
        creating 3-Dimensional vascular volume model comprising a plurality of cylindrical elements, each respective cylindrical element being located at a location corresponding to a respective centerline of a respective corresponding branch segment of the vascular tree model, and each respective cylindrical element having a respective branch segment radius corresponding to an observed radius of the respective corresponding branch segment of vascular tree model;
        defining a 3-Dimensional grid of voxels corresponding to 3-Dimensional vascular volume model;
        generating a similarity metric by comparing vessels apparent in the 3-Dimensional medical image data to the 3-Dimensional grid of voxels; and
        iteratively increasing the similarity metric for the corresponding 3-Dimensional vascular volume model by:
            adjusting at least one of a respective centerline trajectory and a respective branch segment radius of at least one cylindrical element within the plurality of cylindrical elements;
            redefining the 3-Dimensional grid of voxel based on the adjusting the at least one of a respective centerline trajectory and a respective branch segment radius of at least one cylindrical element within the plurality of cylindrical elements; and
            regenerating the similarity metric based on the redefining the 3-Dimensional grid.

2. The method of claim 1, further comprising:
    assigning, based on identifying a respective branch segment in association with the iteratively identifying, the respective branch segment to a respective sub-tree within the vascular tree model; and
    determining at least one erroneous bifurcation point within the plurality of identified bifurcation points, each erroneous bifurcation point being identified based upon at least one of the downstream identified branch segments of the erroneous bifurcation point being previously assigned to a sub tree.

3. The method of claim 2, further comprising:
   removing, based on determining at least one erroneous bifurcation point, portions of branch segments adjacent to a respective erroneous bifurcation point; and
   identifying two disjoint branch segments near the respective erroneous bifurcation point, the two disjoint branch segments having a solid angle between their trajectories of less than +/−15 degrees.

4. The method of claim 3, wherein the identifying two disjoint branch segments is further based upon the two branch segments having respective radii within 20% of each other.

5. The method of claim 1, further comprising:
   identifying a short branch segment within the plurality of identified branch segments,
      the short branch segment comprising a branch segment separating a first bifurcation point and a second bifurcation point,
      wherein the short branch segment is one respective downstream branch segment of the first bifurcation point, and
      wherein the short branch segment is identified based on having a length less than twice a radius of a respective upstream branch segment of the first bifurcation point.

6. The method of claim 5, wherein the short branch segment is further identified based on having a length less than a quantity equal to twice a radius of a respective upstream branch segment of the first bifurcation point divided by a sin of a solid angle between the respective downstream branch segment of the first bifurcation point and a downstream segment of the second bifurcation point.

7. The method of claim 1, wherein the iteratively identifying comprises:
   receiving a location of a seed point in the 3-Dimensional medical image data; and
   defining as a top root point of the vascular tree model, based on receiving the location of the seed point, a point within one of the identified image elements that is near the location of the seed point,
   wherein the iteratively identifying begins traversing the identified image elements from the top root point.

8. A system for characterizing vascular anatomy depicted in 3-dimensional medical images, the system comprising:
   an image processor configured to:
   iteratively identify, based on traversing identified image elements within 3-Dimensional medical image data, respective identified branch segments within a plurality of identified branch segments of at least one vessel tree, each iteration identifying different respective identified branch segments;
   identify, based on the traversing and the iteratively identifying respective identified branch segments, a plurality of identified bifurcation points, wherein each identified bifurcation point comprises at least a second identified branch segment splitting from the respective branch segment being traversed;
   determine a respective radius of each respective identified branch segment at points along the respective identified branch segment;
   identify, at each respective candidate bifurcation point, a respective upstream identified branch segment and at least two respective downstream identified branch segments, wherein a respective radius of the respective upstream identified branch segment is greater than a respective radius of each of the at least two respective downstream branch segments;
   define, based on the iteratively identifying respective identified branch segments, on the identifying the plurality of identified bifurcation points, and on the respective upstream identified branch segment, a vascular tree model corresponding to the plurality of identified branch segments and the plurality of identified bifurcation points;
   fit a smoothed curve to a respective centerline of each identified branch segment in the vascular tree model;
   create 3-Dimensional vascular volume model comprising a plurality of cylindrical elements, each respective cylindrical element being located at a location corresponding to a respective centerline of a respective corresponding branch segment of the vascular tree model, and each respective cylindrical element having a respective branch segment radius corresponding to an observed radius of the respective corresponding branch segment of vascular tree model;
   define a 3-Dimensional grid of voxels corresponding to 3-Dimensional vascular volume model;
   generate a similarity metric by comparing vessels apparent in the 3-Dimensional medical image data to the 3-Dimensional grid of voxels; and
   iteratively increase the similarity metric for the corresponding 3-Dimensional vascular volume model by:
      adjusting at least one of a respective centerline trajectory and a respective branch segment radius of at least one cylindrical element within the plurality of cylindrical elements;
      redefining the 3-Dimensional grid of voxel based on the adjusting the at least one of a respective centerline trajectory and a respective branch segment radius of at least one cylindrical element within the plurality of cylindrical elements; and
      regenerating the similarity metric based on the redefining the 3-Dimensional grid.

9. The system of claim 8, the image processor further configured to:
   assign, based on identifying a respective branch segment in association with the iteratively identifying, the respective branch segment to a respective sub-tree within the vascular tree model; and
   determine at least one erroneous bifurcation point within the plurality of identified bifurcation points, each erroneous bifurcation point being identified based upon at least one of the downstream identified branch segments of the erroneous bifurcation point being previously assigned to a sub tree.

10. The system of claim 9, the image processor further configured to:
    remove, based on determining at least one erroneous bifurcation point, portions of branch segments adjacent to a respective erroneous bifurcation point; and
    identify two disjoint branch segments near the respective erroneous bifurcation point, the two disjoint branch segments having a solid angle between their trajectories of less than +/−15 degrees.

11. The system of claim 10, wherein the image processor is further configured to identify two disjoint branch segments based upon the two branch segments having respective radii within 20% of each other.

12. The system of claim 8, the image processor further configured to:
    identify a short branch segment within the plurality of identified branch segments, the short branch segment comprising a branch segment separating a first bifurcation point and a second bifurcation point,
wherein the short branch segment is one respective downstream branch segment of the first bifurcation point, and
wherein the short branch segment is identified based on having a length less than twice a radius of a respective upstream branch segment of the first bifurcation point.

13. The system of claim 12, wherein the image processor is further configured to identify the short branch segment based on having a length less than a quantity equal to twice a radius of a respective upstream branch segment of the first bifurcation point divided by a sin of a solid angle between the respective downstream branch segment of the first bifurcation point and a downstream segment of the second bifurcation point.

14. The system of claim 8, wherein the iteratively identifying comprises:
receiving a location of a seed point in the 3-Dimensional medical image data; and
defining as a top root point of the vascular tree model, based on receiving the location of the seed point, a point within one of the identified image elements that is near the location of the seed point,
wherein the image processor is further configured to iteratively identify by beginning traversing the identified image elements from the top root point.

15. A non-transitory machine readable medium comprising instructions encoded on a storage medium readable by a processor, the instructions executable by the processor for characterizing vascular anatomy depicted in 3-dimensional medical images, the instructions comprising instructions for:
iteratively identifying, based on traversing identified image elements within 3-Dimensional medical image data, respective identified branch segments within a plurality of identified branch segments of at least one vessel tree, each iteration identifying different respective identified branch segments;
identifying, based on the traversing and the iteratively identifying respective identified branch segments, a plurality of identified bifurcation points, wherein each identified bifurcation point comprises at least a second identified branch segment splitting from the respective branch segment being traversed;
determining a respective radius of each respective identified branch segment at points along the respective identified branch segment;
identifying, at each respective candidate bifurcation point, a respective upstream identified branch segment and at least two respective downstream identified branch segments, wherein a respective radius of the respective upstream identified branch segment is greater than a respective radius of each of the at least two respective downstream branch segments;
defining, based on the iteratively identifying respective identified branch segments, on the identifying the plurality of identified bifurcation points, and on the respective upstream identified branch segment, a vascular tree model corresponding to the plurality of identified branch segments and the plurality of identified bifurcation points;
fitting a smoothed curve to a respective centerline of each identified branch segment in the vascular tree model;
creating 3-Dimensional vascular volume model comprising a plurality of cylindrical elements, each respective cylindrical element being located at a location corresponding to a respective centerline of a respective corresponding branch segment of the vascular tree model, and each respective cylindrical element having a respective branch segment radius corresponding to an observed radius of the respective corresponding branch segment of vascular tree model;
defining a 3-Dimensional grid of voxels corresponding to 3-Dimensional vascular volume model;
generating a similarity metric by comparing vessels apparent in the 3-Dimensional medical image data to the 3-Dimensional grid of voxels; and
iteratively increasing the similarity metric for the corresponding 3-Dimensional vascular volume model by:
adjusting at least one of a respective centerline trajectory and a respective branch segment radius of at least one cylindrical element within the plurality of cylindrical elements;
redefining the 3-Dimensional grid of voxel based on the adjusting the at least one of a respective centerline trajectory and a respective branch segment radius of at least one cylindrical element within the plurality of cylindrical elements; and
regenerating the similarity metric based on the redefining the 3-Dimensional grid.

16. The non-transitory machine readable medium of claim 15, the instructions further comprising instructions for:
assigning, based on identifying a respective branch segment in association with the iteratively identifying, the respective branch segment to a respective sub-tree within the vascular tree model; and
determining at least one erroneous bifurcation point within the plurality of identified bifurcation points, each erroneous bifurcation point being identified based upon at least one of the downstream identified branch segments of the erroneous bifurcation point being previously assigned to a sub tree.

17. The non-transitory machine readable medium of claim 16, the instructions further comprising instructions for:
removing, based on determining at least one erroneous bifurcation point, portions of branch segments adjacent to a respective erroneous bifurcation point; and
identifying two disjoint branch segments near the respective erroneous bifurcation point, the two disjoint branch segments having a solid angle between their trajectories of less than +/−15 degrees.

18. The non-transitory machine readable medium of claim 15, the instructions further comprising instructions for:
identifying a short branch segment within the plurality of identified branch segments,
the short branch segment comprising a branch segment separating a first bifurcation point and a second bifurcation point,
wherein the short branch segment is one respective downstream branch segment of the first bifurcation point, and
wherein the short branch segment is identified based on having a length less than twice a radius of a respective upstream branch segment of the first bifurcation point.

19. The non-transitory machine readable medium of claim 15, wherein the instructions for iteratively identifying comprise instructions for:
receiving a location of a seed point in the 3-Dimensional medical image data; and
defining as a top root point of the vascular tree model, based on receiving the location of the seed point, a point within one of the identified image elements that is near the location of the seed point,
wherein the iteratively identifying begins traversing the identified image elements from the top root point.

* * * * *